US 6,655,757 B2

(12) United States Patent
Prestenbach

(10) Patent No.: US 6,655,757 B2
(45) Date of Patent: Dec. 2, 2003

(54) HEAD AND TAIL SPROCKET ASSEMBLIES FOR A MARSH EXCAVATOR

(76) Inventor: Larry Prestenbach, 147 Doris Ct., Houma, LA (US) 70364

( * ) Notice: Subject to any disclaimer, the term of this patent is extended or adjusted under 35 U.S.C. 154(b) by 0 days.

(21) Appl. No.: 10/081,623

(22) Filed: Feb. 20, 2002

(65) Prior Publication Data

US 2003/0015919 A1 Jan. 23, 2003

Related U.S. Application Data

(63) Continuation-in-part of application No. 09/908,027, filed on Jul. 18, 2001, now Pat. No. 6,482,053.

(51) Int. Cl.[7] ............................................. B62D 55/14
(52) U.S. Cl. ..................... 305/125; 305/116; 305/136; 305/195; 440/12.63
(58) Field of Search ................ 305/181, 195, 305/196, 199, 136, 137, 116, 120, 122, 123, 184, 60, 180, 185, 124, 125; 440/12.63, 12.64, 95; 72/133

(56) References Cited

U.S. PATENT DOCUMENTS

| 874,008 | A | * | 12/1907 | Holt | |
|---|---|---|---|---|---|
| 1,729,693 | A | * | 10/1929 | Tytus | 72/133 |
| 3,282,630 | A | * | 11/1966 | Harrison et al. | |
| 3,362,492 | A | * | 1/1968 | Hansen | |
| 3,567,292 | A | * | 3/1971 | Amsden | |
| 3,667,268 | A | * | 6/1972 | Rech | 72/133 |
| 3,758,169 | A | * | 9/1973 | Trapp | 305/32 |
| 4,846,092 | A | * | 7/1989 | Wilson | 440/12.63 |
| 5,899,164 | A | * | 5/1999 | Coast | 440/12.63 |

* cited by examiner

Primary Examiner—Russell D. Stormer
(74) Attorney, Agent, or Firm—Robert N. Montgomery

(57) ABSTRACT

A head sprocket assembly and sprocketless tail roller assembly for a pontoon track drive system wherein the sprocket assembly and tail roller is fitted with a plurality of support rings for straightening the track's elongated cleats attached to a plurality of chains passing lengthwise around the pontoons.

15 Claims, 3 Drawing Sheets

HEAD AND TAIL SPROCKET ASSEMBLIES FOR A MARSH EXCAVATOR

This invention is a continuation in part of previous application Ser. No. 09/908,027 filed Jul. 18, 2001, now U.S. Pat. No. 6,482,053, currently pending, the specification of which is incorporated herein by reference.

BACKGROUND OF THE INVENTION

1. Field of the Invention

The present invention relates generally to the track drive and tail sprocket assemblies and more particularly to the deletion of sprockets on the tail sprocket assembly and the adaptation of ring supports to the drive and tail sprocket assemblies for straightening bent cleats.

2. General Background

Excavating equipment used in wetlands is equipped with pontoons fitted with two or more runs of roller chains having plurality of elongated bar cleats attached to the chains. The chains are threaded lengthwise around head and tail sprocket assemblies located at each end of the pontoons. The head and tail sprocket or roller assemblies are generally fitted with sprockets, thereby providing a guide path for the chains to pass around the roller assembly.

Since such wet land vehicles operate in a semi-submerged condition in mud and water they often encounter a great deal of unseen debris such as rock, limbs and stumps. This debris often bends the elongated cleats extending between the chains or becomes trapped between the pontoon and the roller assemblies. When the debris is trapped it tends to be pulled into and pinched between the chain and the sprocket teeth, often breaking the chain. Downtime due to bending of the cleats and breaking of chains is expensive and a constant irritation to the operators.

It is an object of the instant invention to provide a means for straightening the cleats each time they pass over the roller assemblies.

It is also an object of the invention to provide a tail roller assembly without sprockets, thereby eliminating the possibility of feeding debris between the chain and sprocket teeth.

SUMMARY OF THE INVENTION

The present invention discloses a head sprocket assembly and sprocketless tail roller assembly for a pontoon track drive system wherein the sprocket assembly and tail roller is fitted with a plurality of support rings for straightening the track's elongated cleats attached to a plurality of chains passing lengthwise around the pontoons.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
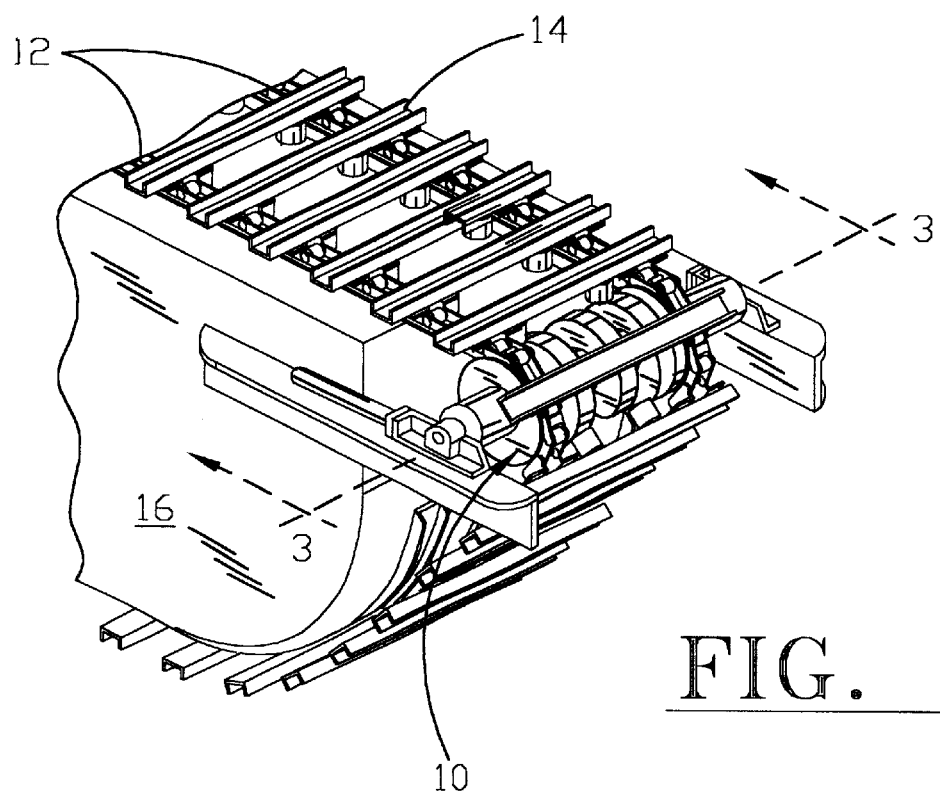
FIG. 1 is an isometric view of the head chain roller assembly with chains mounted to a pontoon.

Looking first at FIG. 1, we see the tail roller assembly 10 with a pair of chains 12 supporting elongated channel cleats 14 spanning the two endless chain runs extending lengthwise along the pontoon 16 and passing around the tail roller assembly 10.

Figure 2:
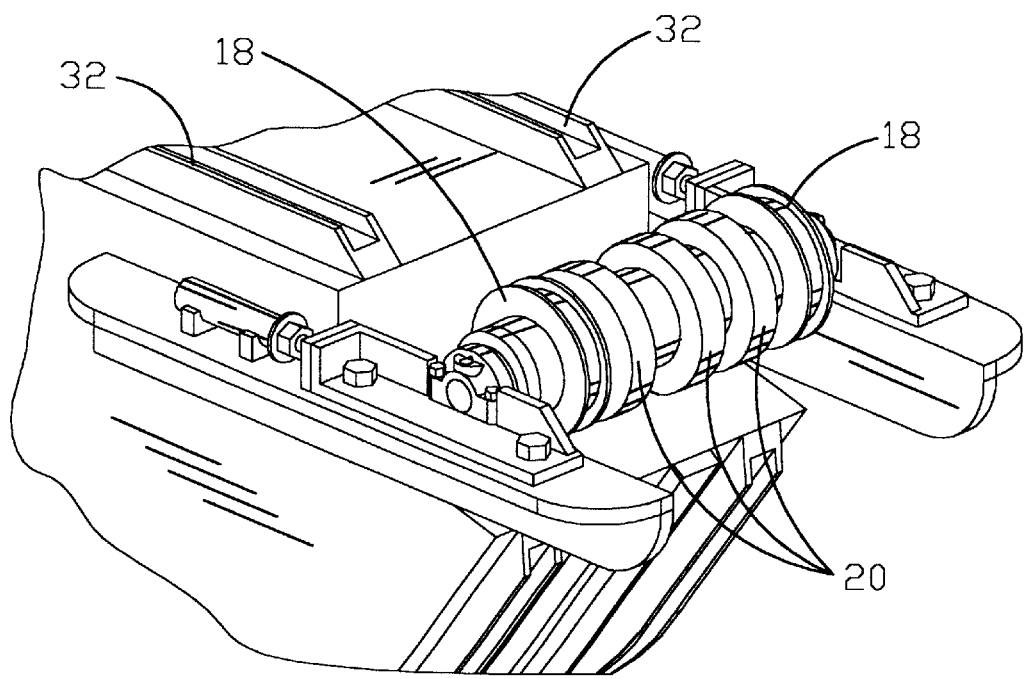
FIG. 2 is an isometric view of the head chain roller assembly mounted to a pontoon.
Figure 3:
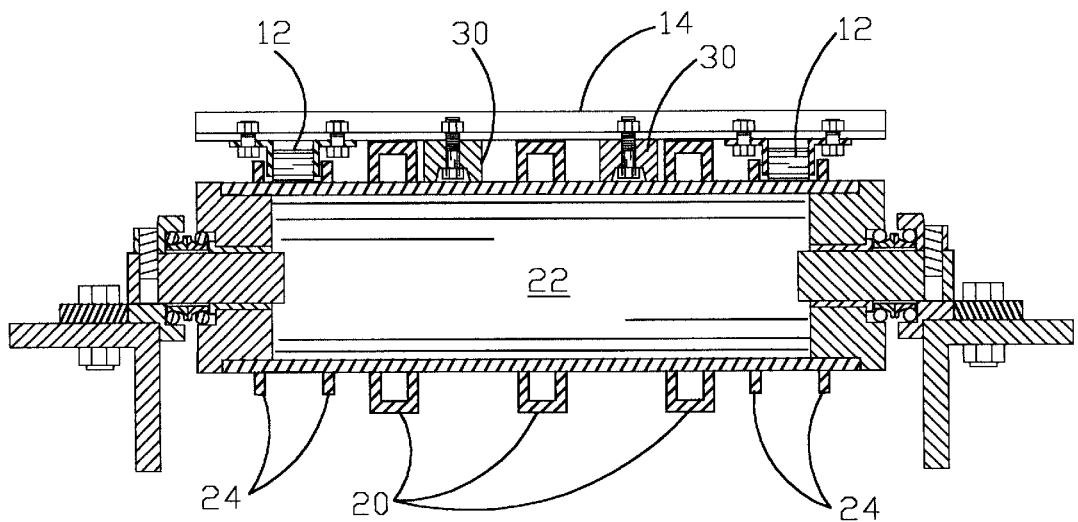
FIG. 3 is a cross section view of the head chain roller assembly.
Figure 4:
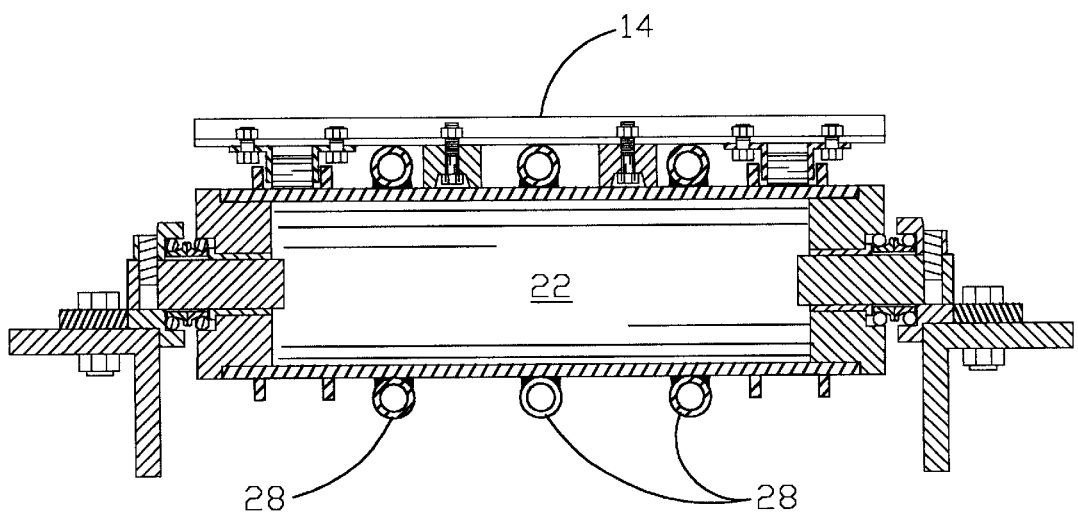
FIG. 4 is a cross section view of an alternate embodiment of the head chain roller assembly

As seen in FIG. 1, the tail chain roller assembly 10 is fitted with a toothless chain guide 18 adjacent each end of the roller assembly 10 and a plurality of support rings 20 located there between as shown in FIG. 2. As further seen in cross section in FIG. 3, the sprocketless roller assembly 10 is an elongated tube or drum assembly 22 fitted with end caps 23 and bushings 25 and supports at each end by stub shafts 27 and bearings 29. The roller chains 12 are guided around the roller drum 22 by the chain guide 18 comprised of rings 24 attached to the drum assembly 22 and located either side of the chains 12. As seen here in cross section, the support rings 20 are also attached to the roller drum assembly 22 and are located at intervals intermediate the chain guide rings 24. The support rings 20 may have a rolled channel or box configuration or may simply be tubular rings 28 as seen in FIG. 4. The rings 24 may be constructed by fabrication such as from a pair of disks with a band spanning the disk or by rolling structural shapes such as channel, box or round tubing. The rings may also be made from a polymeric and keyed to the roller drum assembly 22 or be a series of disk attached in parallel to produce the same effect. In any case, the support rings 20 or 28 are sized to be the same height as the roller chain 12 and the approximate the height of the polymeric guides 30 attached to the cleats 14 serving as guides along the channel guide ways 32 seen in FIG. 2 and further providing alignment and additional cleat support while passing around the head roller drum 22. The rings 20 provide even support for the cleats 14 and tend to straighten any bent cleats as they pass over the sprocketless roller assembly 10.

Figure 5:
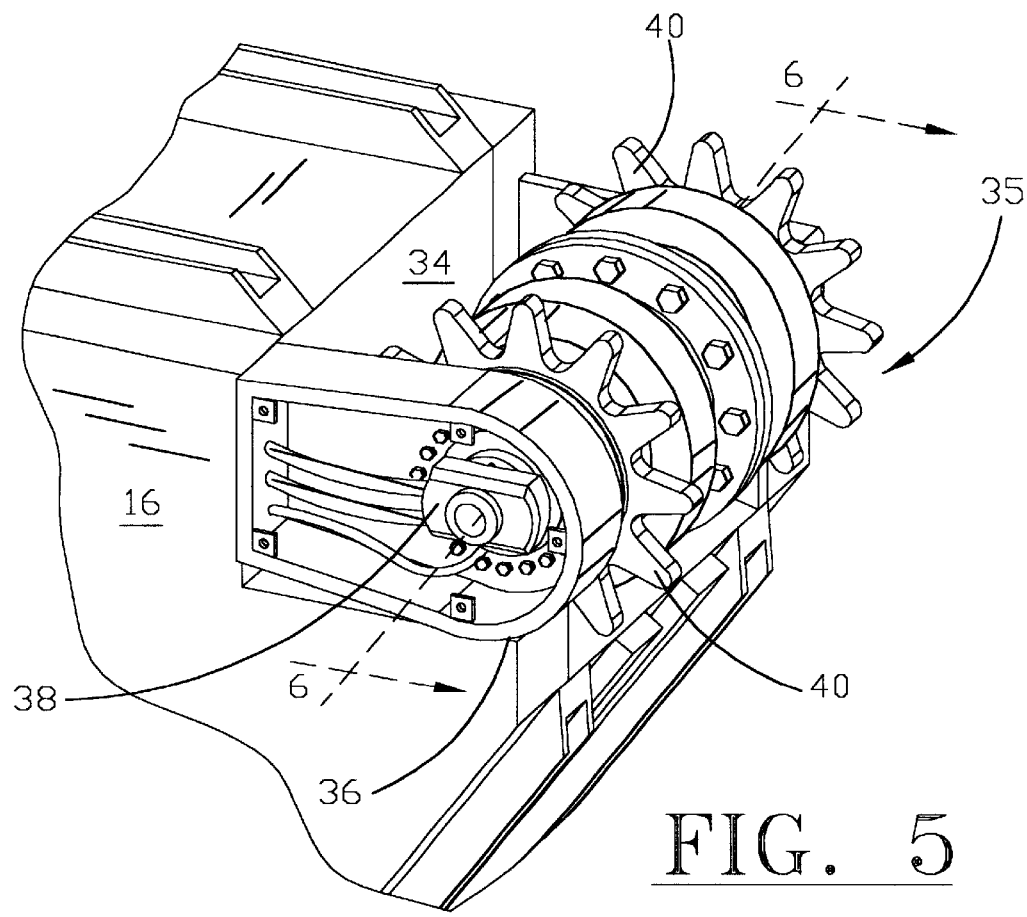
FIG. 5 is an isometric view of the drive sprocket assembly.

As seen in FIG. 5, the drive sprocket assembly 35 is located in a notched portion 34 of the pontoon 16 in a manner whereby the drive motor 38 and its housing 36 is facing the outboard side of the drive assembly and pontoon 16 in the manner shown, thereby protecting the drive motor 38 from any possibility of damage in cases where operating portions of the equipment attached to a pair of the pontoons 16 passes between the pontoons.

Figure 6:
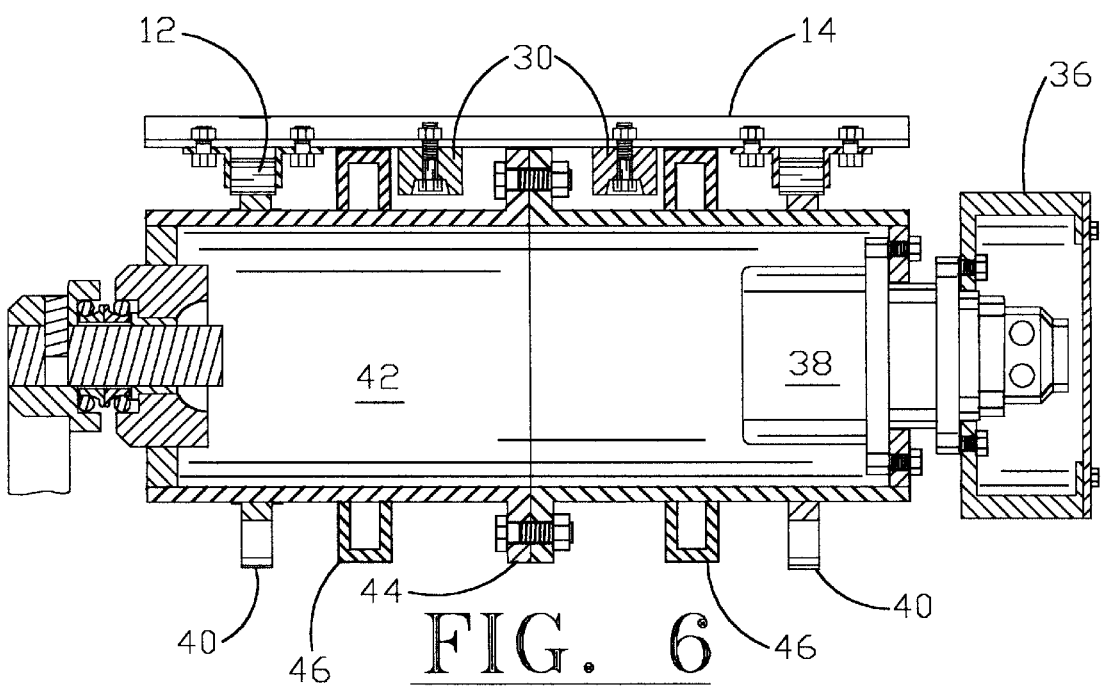
FIG. 6 is a cross section view of the drive sprocket assembly taken along sight line 6—6 seen in FIG. 5.

The drive assembly 32 seen in FIG. 5 may be configured whereby a pair of sprockets 40 is secured to a drum 42 seen in FIG. 6. In this case a sprocket 40 is located at each end of the drum 42 and the drum may also be dividable at the center by a flange coupling 44, in which case the outer diameter of the flanges of the coupling 44 may be such that they are equal to the distance between the cleats 14 and the drum 42 established by the combined height of the roller chain 12 and the sprocket roller root depth to drum dimension thereby providing a central support for the cleats 14 as they pas over the head drive assembly. Rings 46 similar to items 20 or 28 adjusting for the difference in height may be installed ion each side of the flange 44. The polymeric guides 30 may also utilize the support rings 46 to help guide the cleats around the drive assembly 32.

Rings 20 or 28 and 46 provide straightening of bent cleats 14 and thus prevent misalignment of the chains 12 and broken cleats.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A pontoon chain drive assembly having an inboard and outboard side comprising a sprocketless tail roller assembly located at one end of said pontoon and a chain sprocket drive roller assembly located at the opposite end of said pontoon with at least two endless loops of roller chain connected in parallel by a plurality of inverted channel cleats having polymeric channel guides attached thereto passing around said drive sprocket roller assembly and said tail roller assembly, said tail roller assembly comprising an elongate tubular drum rotatably supported upon a stub shaft located at each end, a plurality of ring members attached to said tubular drum located intermediate said roller chain in a manner whereby said channel cleats and said polymeric guides are in contact with said ring members while passing around said tubular drum.

2. The pontoon chain drive assembly according to claim 1 wherein said ring members are structural channel members formed with the channel portion facing said tubular drum.

3. The pontoon chain drive assembly according to claim 1 wherein said ring members are rolled tubular members.

4. The pontoon chain drive assembly according to claim 1 wherein said sprocketless tail roller assembly further comprises at least one guide ring for each said roller chain located adjacent said chain and attached to said tubular drum.

5. The pontoon chain drive assembly according to claim 1 wherein said chain sprocket drive roller assembly utilizes an intermediate flange joint as one of said plurality of ring members for cleat support.

6. The pontoon chain drive assembly according to claim 5 wherein said chain drive sprocket roller assembly utilizes an intermediate flange joint as one of said plurality of ring members for cleat support with at least one of said ring members located between said flange joint and each said chain.

7. The pontoon chain drive assembly according to claim 1 wherein said chain drive sprocket roller assembly is adapted to said pontoon in such a manner that its drive motor faces said outboard side of said pontoon drive assembly.

8. A pontoon chain drive assembly having an inboard and outboard side comprising:

a) a sprocketless tail roller assembly located at one end of said pontoon;

b) a chain sprocket drive roller assembly located at an end of said pontoon opposite said tail roller having an integral drive motor;

c) at least two endless loops of roller chain located in parallel passing around said pontoon, sprocketless tail roller assembly and said chain sprocket drive roller assembly;

(d) a plurality of inverted channel cleats connected to each of said loops of roller chain having at least one polymeric guide member attached to each of said channel cleats;

e) a plurality of ring members attached to said sprocketless tail roller assembly and said chain sprocket drive roller assembly located intermediate said roller chain in a manner whereby said cleats and said polymeric guide member is in contact with said ring members; and f) at least one guide ring attached to each of said sprocketless tail roller assembly and said chain sprocket drive roller assembly located adjacent said roller chain.

9. The pontoon chain drive assembly according to claim 8 wherein said ring members are fabricated structural channel members.

10. The pontoon chain drive assembly according to claim 8 wherein said ring members are polymeric members.

11. The pontoon chain drive assembly according to claim 8 wherein said chain drive sprocket roller assembly utilizes an intermediate flange joint as one of said plurality of ring members for cleat support.

12. The pontoon chain drive assembly according to claim 11 wherein said chain sprocket drive roller assembly further comprises at least one of said ring members located between said flange joint and each said endless loops of roller chain.

13. The pontoon chain drive assembly according to claim 8 wherein said chain drive roller assembly is adapted to said pontoon in such a manner that its drive motor faces said outboard side of said pontoon chain drive assembly.

14. A method for straightening bent channel cleats associated with a pontoon chain drive assembly comprising a tail roller assembly and a chain drive roller assembly and at least two endless loops of roller chain connected in parallel by a plurality of inverted channel cleats passing longitudinally around pontoon and said drive assembly comprising the step of providing at least one said roller assembly with a plurality of ring members attached to said roller assembly located intermediate said roller chain in a manner whereby said cleats are forced into alignment by said ring members while passing around said roller assembly.

15. The method for straightening bent channel cleats according to claim 14 further includes the step of utilizing a drive roller having a roller drum flange located intermediate said chains as one of said ring members.

* * * * *